(12) United States Patent
Fertig

(10) Patent No.: US 10,989,811 B2
(45) Date of Patent: Apr. 27, 2021

(54) IMAGE SENSING USING ATOMIC VAPOR CELL ASSEMBLIES

(71) Applicant: Honeywell International Inc., Morris Plains, NJ (US)

(72) Inventor: Chad Fertig, Bloomington, MN (US)

(73) Assignee: Honeywell International Inc., Charlotte, NC (US)

( * ) Notice: Subject to any disclaimer, the term of this patent is extended or adjusted under 35 U.S.C. 154(b) by 118 days.

(21) Appl. No.: 16/370,495

(22) Filed: Mar. 29, 2019

(65) Prior Publication Data

US 2020/0309946 A1 Oct. 1, 2020

(51) Int. Cl.
*G01S 17/04* (2020.01)
*G01S 7/481* (2006.01)

(52) U.S. Cl.
CPC ............ *G01S 17/04* (2020.01); *G01S 7/4816* (2013.01)

(58) Field of Classification Search
CPC ..... G01S 17/04; G01S 7/4816; H04N 5/2256; H04N 5/2354; H04N 5/238; H04N 5/335; G02F 2/02
USPC ...................................................... 250/341.8
See application file for complete search history.

(56) References Cited

U.S. PATENT DOCUMENTS

| 5,095,212 A | 3/1992 | Cook | |
| 5,710,652 A * | 1/1998 | Bloom | H04B 10/118 |
| | | | 398/129 |
| 6,008,496 A * | 12/1999 | Winefordner | H01J 47/02 |
| | | | 250/397 |
| 8,605,282 B2 * | 12/2013 | Groswasser | G01N 21/23 |
| | | | 356/367 |
| 9,121,889 B2 * | 9/2015 | Tuchman | G01R 33/032 |
| 9,575,144 B2 * | 2/2017 | Kornack | G01R 33/26 |
| 9,971,000 B2 | 5/2018 | Bohi et al. | |
| 9,995,800 B1 * | 6/2018 | Schwindt | G01R 33/26 |
| 10,340,658 B1 * | 7/2019 | Boyd | H01S 3/105 |

(Continued)

FOREIGN PATENT DOCUMENTS

WO 2016179158 A2 11/2016

OTHER PUBLICATIONS

Dorow, "An introduction to the Technique and Applications of Pump-Probe Spectroscopy", Special Topic Paper, Physics 211A, Fall 2014, University of California San Diego, Dec. 4, 2014.

(Continued)

*Primary Examiner* — David P Porta
*Assistant Examiner* — Gisselle M Gutierrez
(74) *Attorney, Agent, or Firm* — Fogg & Powers LLC

(57) ABSTRACT

Systems and methods for image sensing using atomic vapor cell assemblies are provided. In certain embodiments, a device includes an atomic vapor cell assembly containing atoms associated with multiple pixel locations; a readout laser source that emits readout lasers that illuminate the atoms; a pump laser source that illuminates the atoms with pump lasers to prepare the atoms that are in a dark ground state, wherein an atom in the dark ground state is not coupled to the readout lasers; and a targeting laser source that emits a targeting laser towards a target, wherein a portion of the targeting laser reflected by the target that is incident upon the atoms causes the atoms to transition to a bright ground state; wherein the atoms in the bright ground state are coupled to the readout laser and emit multiple readout photons.

20 Claims, 5 Drawing Sheets

(56) References Cited

U.S. PATENT DOCUMENTS

| | | | | |
|---|---|---|---|---|
| 2007/0076776 | A1* | 4/2007 | Lust | G04F 5/145 |
| | | | | 372/56 |
| 2008/0225907 | A1* | 9/2008 | Diels | H01S 3/1392 |
| | | | | 372/25 |
| 2009/0256561 | A1* | 10/2009 | Ledbetter | G01R 33/282 |
| | | | | 324/305 |
| 2018/0315529 | A1* | 11/2018 | Denatale | H01F 27/2804 |
| 2018/0315536 | A1* | 11/2018 | Tarashansky | G01R 33/288 |
| 2018/0321641 | A1* | 11/2018 | Boyd | H01S 3/0085 |
| 2019/0187198 | A1* | 6/2019 | Anderson | G01R 29/0878 |
| 2020/0002802 | A1* | 1/2020 | Kitching | C23C 14/18 |
| 2020/0103475 | A1* | 4/2020 | Kim | G01R 33/26 |

OTHER PUBLICATIONS

Horsley et al., "Widefield microwave imaging in alkali vapor cells with sub-100 μm resolution", New Journal of Physics, Nov. 6, 2015, pp. 1-12, Institute of Physics.

European Patent Office, "Extended European Search Report from EP Application No. 20165414.2", from Foreign Counterpart to U.S. Appl. No. 16/370,495, dated Sep. 2, 2020, pp. 1 through 5, Published: EP.

Mazelanik et al., "Coherent spin-wave processor of stored optical pulses", Aug. 2, 2018, pp. 1 through 11.

\* cited by examiner

IMAGE SENSING USING ATOMIC VAPOR CELL ASSEMBLIES

BACKGROUND

Imaging detectors have become an important technology in security applications such as motion detection and facial recognition applications. Implementations of imaging detectors frequently use charge-coupled device (CCD) imaging detectors such that CCD imaging detectors have become a ubiquitous technology in image detection. One application of CCD imaging detectors is providing image detection in low-light environments. In low light environments, each pixel in a CCD array may receive close to one photon in a given exposure time. To increase the sensitivity of the CCD imaging detectors, the CCD pixels may be cooled, and signals produced by the CCD pixels may be electronically amplified.

SUMMARY

Systems and methods for image sensing using atomic vapor cell assemblies are provided. In certain embodiments, a device includes an atomic vapor cell assembly containing a plurality of atoms associated with a plurality of pixel locations. The device also includes one or more readout laser sources that emit one or more readout lasers that illuminate the plurality of atoms. Further, the device includes one or more pump laser sources that illuminate the plurality of atoms with one or more pump lasers to prepare one or more atoms in the plurality of atoms that are in a dark ground state, wherein an atom in the dark ground state is not coupled to the one or more readout lasers. Additionally, the device includes one or more targeting laser sources that emit one or more targeting lasers towards a target, wherein a portion of the one or more targeting lasers reflected by the target that is incident upon the one or more atoms causes the one or more atoms to transition to a bright ground state; wherein the one or more atoms in the bright ground state are coupled to the one or more readout lasers and emit one or more readout photons.

DRAWINGS

Understanding that the drawings depict only some embodiments and are not therefore to be considered limiting in scope, the exemplary embodiments will be described with additional specificity and detail using the accompanying drawings, in which.

In accordance with common practice, the various described features are not drawn to scale but are drawn to emphasize specific features relevant to the example embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made.

Described herein are systems and methods for image sensing using atomic vapor cell assemblies. In particular, an atomic vapor cell assembly may contain multiple atomic vapor pixels that are used to receive photons reflected by a target. Atoms within the atomic vapor cell assembly react to the received photons while remaining in ground states to convey an image of the target to a series of photodetectors. By using an atomic vapor cell assembly, systems and methods described herein can capably convey an image of a target with high intrinsic quantum efficiency, low dark counts, and relatively high readout rates. Accordingly, atomic vapor cell assemblies may be suited for acquiring imaging data in environments having extremely low levels of illumination.

Figure 1:
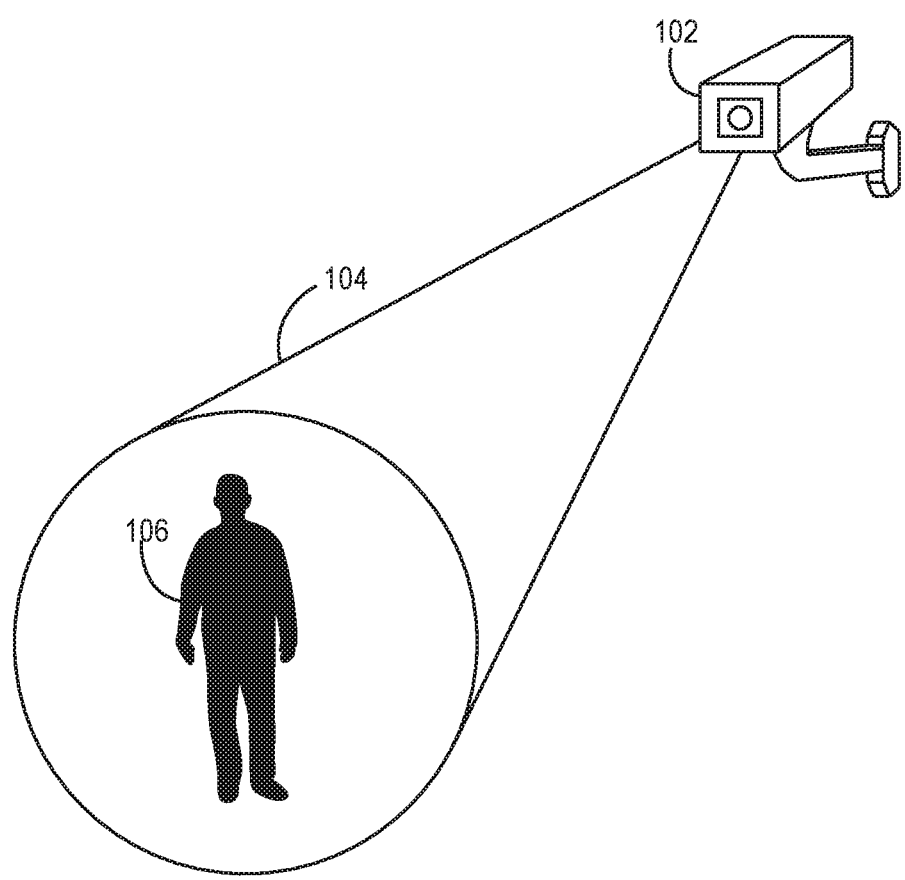
FIG. 1 is a diagram illustrating an exemplary image capturing device according to an aspect of the present disclosure.

FIG. 1 is a diagram illustrating an image capturing device 102 that attempts to capture image data describing a target 106. In certain applications, the image capturing device 102 may attempt to acquire image information of the target 106 that is within a field of view 104 of the image capturing device 102. For example, in certain embodiments, the image capturing device 102 may include multiple pixels associated with photodetectors that react to light reflected by the target 106. When light is incident on the photodetectors, the photodetectors produce one or more electrical signals that are subsequently processed to produce image data that can be used to describe the target 106.

In some implementations, the image capturing device 102 may attempt to capture image data of the target 106 in an environment where there is extremely low light. In an extremely low light environment, the number of photons received by the pixels, in a given exposure time, may be extremely low, even approaching the reception of a single photon within a given exposure time. In such an environment, to accurately acquire image information, the image capturing device 102 may have high quantum efficiency, where the quantum efficiency describes the percentage of received photons that are actually detected. For example, if a pixel receives five photons and is able to detect one of the photons, then the quantum efficiency would be twenty percent. Also, to accurately acquire image information in low-light environments, the pixels may have low dark counts (be insensitive to noise produced by the electronics) and relatively high readout rates.

Frequently, charge-coupled devices (CCD) pixels are used to acquire image information of a target 106 in low-light environments. To increase the sensitivity of the CCD pixels for low-light environments, the CCD pixels may be cooled. Also, the image capturing device 102 may electronically amplify the electrical signals produced by the CCD pixels. However, cooling the CCD pixels may not always be effective and electronic amplification can contribute noise to the signal that can potentially swamp the signal produced by the light reflected by the target 106 that is incident on the CCD pixels. Also, the CCD pixels may not have sufficient quantum efficiency to reliably receive the photons that are reflected by the target 106 in extremely low-light environments.

Figure 2:
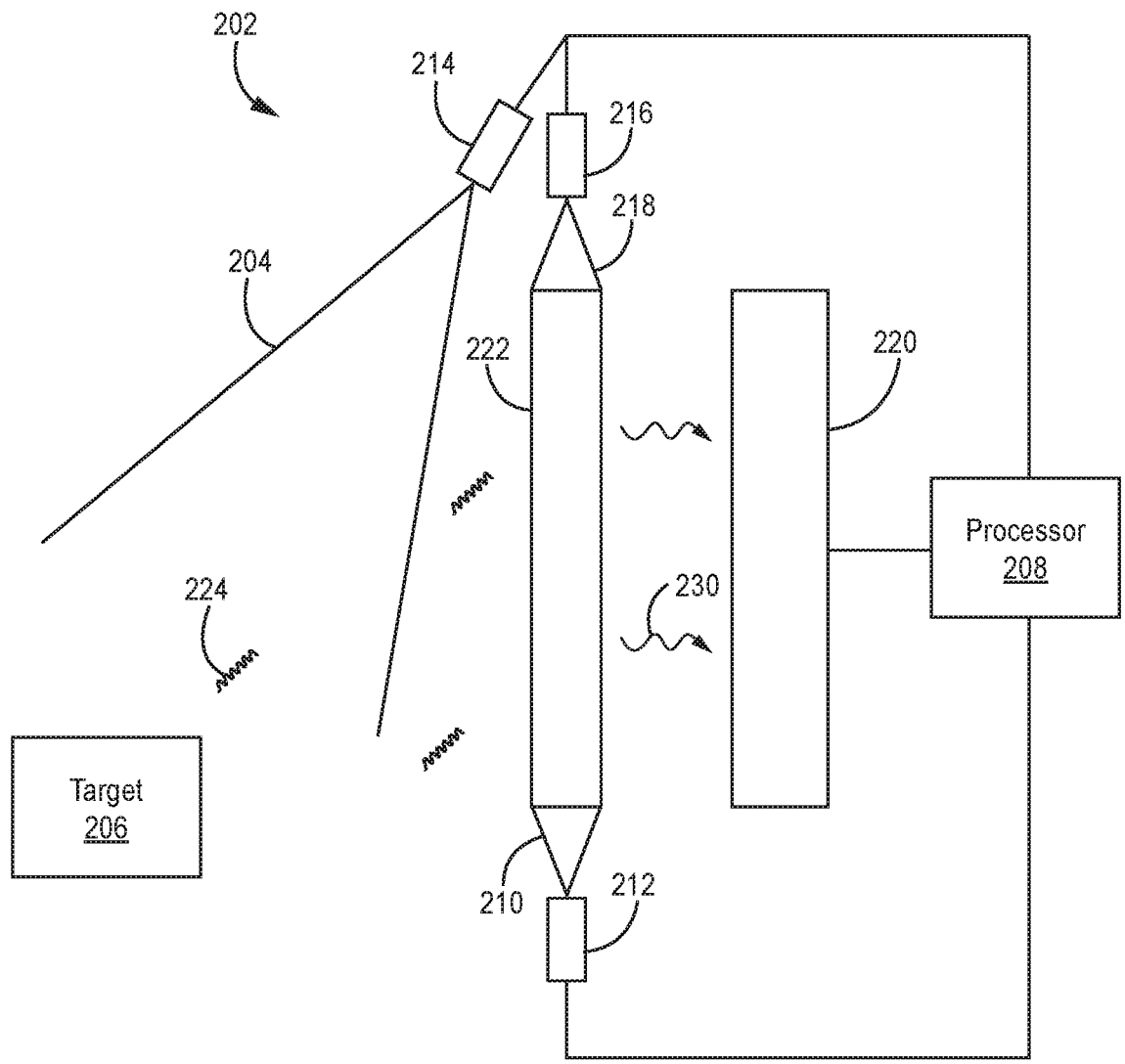
FIG. 2 is a block diagram illustrating an exemplary system for image sensing using an atomic vapor cell assembly according to an aspect of the present disclosure.

FIG. 2 is a block diagram of a system 202 that acquires image data of a target 206 using an atomic vapor cell assembly 222. In particular, the system 202 may be able to accurately and reliably acquire image data in low-light environments. In certain embodiments, to acquire image data of the target 206, the system 202 may include one or more targeting laser sources 214. As used herein, a targeting laser source 214 may refer to a laser source that emits a targeting laser 204 at a particular frequency in a direction away from the system 202 to illuminate the target 206 when it comes within the field of view illuminated by the targeting laser 204.

When the targeting laser 204 is incident upon the target 206, a portion 224 of the targeting laser 204 may reflect off of a surface of the target 206 back towards the system 202 to be received by the system 202. As used herein, the portion 224 of the targeting laser 204 may refer to one or more photons of the targeting laser 204 that are reflected by the targeting laser 204 and incident on the atomic vapor cell assembly 222 of the system 202. In some embodiments, where the environment is a low light environment, the targeting laser source 214 may be a low-power diode and the targeting laser 204 may be an ultra-low intensity laser. However, the targeting laser source 214 may be one or more of multiple devices capable of emitting a laser of varying levels of intensity. Additionally, the targeting laser 204 emitted by the targeting laser source 214 may have a wavelength in the infrared range or other wavelength outside of the human visible spectrum. By being outside the visible spectrum, a target 206, such as a person, may be unaware that image information is being collected. Further, in some implementations, the targeting laser 204 may have wavelengths within the visible spectrum.

In some embodiments, the atomic vapor cell assembly 222 may refer to one or more atomic vapor cells that contain multiple atoms, where each atomic vapor cell may be associated with a different pixels and corresponding pixel location. As used herein, a pixel location may refer to a location on the surface of the atomic vapor cell assembly 222. Further, an atomic vapor cell may refer to a sealed cell containing atomic vapor, whereupon the portion 224 of the targeting laser 204 that is incident upon a surface of the atomic vapor cell assembly 222 may pass into a cell and be incident on and excite one or more atoms within one of the atomic vapor cells. The location where the one or more atoms are excited may be associated with a particular pixel location. In some implementations, the gas that may be within the atomic vapor cell may be rubidium, cesium, another atomic vapor, or combination of different atomic vapors.

In certain embodiments, the system 202 may include one or more pump laser sources 212 that illuminate the plurality of atoms within the atomic vapor cell assembly 222 with one or more pump lasers 210. As used herein, a pump laser 210 may refer to a laser that works with the targeting laser 204 to provide the two legs of a Raman transition. In particular, the atoms within the atomic vapor cell assembly 222 may originally be in a dark ground state, where atoms in a dark ground state are atoms that do not absorb or emit photons when the atoms are illuminated by a laser of a particular frequency, such as a readout laser 218 produced by a readout laser source 216 described in greater detail below. When a photon from the pump laser 210 and a reflected portion 224 of the targeting laser 204 are incident upon the same atom within the atomic vapor cell assembly 222, the atom transitions from the dark ground state to a bright ground state. When an atom is in the bright ground state, the atom will respond to illumination by a laser of a particular frequency, such as the readout laser 218. In certain implementations, an atom in the bright ground state responds to the readout laser 218 by absorbing photons in the readout laser 218 and emitting them. The readout photons 230 emitted by the illuminated atoms in the bright ground state may be received by one or more photodetectors 220. The readout laser 218 can cause many readout photons 230 to be emitted by an atom for only one target photon in the reflected portion 224 that is received by the atom within the atomic vapor cell assembly 222. In this way, this method provides for a multiplication factor, or gain factor, by which one target photon received by an atom pixel results in multiple readout photons 230 emitted by an atom, such as 10,000 readout photons 230 created per 1 target photon received. In some instances, multiple atoms within a given atomic vapor cell pixel may each absorb a received target photon. In these instances, more than one atom in each vapor cell may emit readout photons 230.

In certain embodiments, the pump laser 210 illuminates all the atoms within the atomic vapor cell assembly 222. For example, the pump laser source 212 may shine the pump laser 210 into a side of the atomic vapor cell assembly 222 that is adjacent to the front side of the atomic vapor cell assembly 222, where the atomic vapor cell assembly 222 receives the reflected portion 224 of the targeting laser 204 through the front side of the atomic vapor cell assembly 222. Alternatively, a diffuser (not shown) may be mounted on a surface of the atomic vapor cell assembly 222, where the pump laser source 212 shines the pump laser 210 into the diffuser and the diffuser diffuses the pump laser 210 such that the pump laser 210 is incident along a surface of the atomic vapor cell assembly 222. Also, the pump laser source 212 may emit the pump laser 210 onto the front side of the atomic vapor cell assembly 222.

In an additional embodiment, the pump laser source 212 may be multiple laser sources, where each laser source is associated with a pixel location or subset of the possible pixel locations. For example, the multiple laser sources may be different vertical cavity surface emitting lasers (VCSELs), where each VCSEL is located against a pixel location on a side of the atomic vapor cell assembly 222 that is opposite to the front side of the atomic vapor cell assembly 222 that receives the reflected portion 224 of the targeting laser 204.

In additional embodiments, the pump laser 210 may be at a frequency that is similar to the frequency of the targeting laser 204 but different by a small frequency. For example, the pump laser 210 and the targeting laser 204 may be used to stimulate Raman transitions for rubidium. Since the pump laser 210 and the targeting laser 204 stimulate Raman transitions in rubidium, the pump laser 210 and the targeting laser 204 may both have wavelengths close to 795 nm. The pump laser 210 and the targeting laser 204 may be at different frequencies when stimulating Raman transitions in other elements. Further, like the targeting laser 204, the pump laser 210 may also have a wavelength in the infrared range of light and/or have a wavelength that is otherwise outside the visible spectrum. Further, in some implementations, the pump laser 210 may have wavelengths within the visible spectrum.

As mentioned above, the system 202 may include a readout laser source 216 that produces a readout laser 218 that illuminates the atoms within the atomic vapor cell assembly 222. The photons of the readout laser 218 may be at a wavelength that is absorbable by the atoms when the atoms have transitioned into the bright ground state. When the atoms are in the bright ground state, the atoms are able to absorb the readout laser 218 and emit photons. For example, when the atoms are rubidium atoms and one or more atoms in the atomic vapor cell assembly 222 are in the bright ground state, the atoms in the bright ground state may absorb photons having a wavelength close to 780 nm. After an atom absorbs a photon from the readout laser 218, the atom transitions from the bright ground state to an electronically excited state, then spontaneously decays back down to the bright ground state, emitting a spontaneous readout photon 230. The atom may then absorb another photon in the readout laser 218 and emit another spontaneous readout photon 230. This process may happen in a cyclical fashion, such that many spontaneous readout photons 230 can be emitted by one atom. In some cases, one atom may emit from between 10 and 10,000 spontaneous readout photons 230, having absorbed only one target photon.

A spontaneous readout photon 230 may have a direction of propagation which is different from the readout laser 218. In some implementations, photodetectors 220 are positioned so as to be illuminated only by spontaneous readout photons 230, but not by photons in the readout laser 218 that are emitted by the readout laser source 216 but that do not interact with an atom which has completed a transition to the bright ground state.

In a similar manner to the pump laser 210 and the targeting laser 204, the readout laser 218 may have a wavelength within the infrared range of light. Alternatively, the readout laser 218 may have other wavelengths outside the visible spectrum. Further, in some implementations, the readout laser 218 may have wavelengths within the visible spectrum.

In certain embodiments, the readout laser 218 may illuminate all the atoms within the atomic vapor cell assembly 222. For example, the readout laser source 216 may shine the readout laser 218 into a side of the atomic vapor cell assembly 222 that is adjacent to the front side of the atomic vapor cell assembly 222. Alternatively, a diffuser (not shown) may be mounted on a surface of the atomic vapor cell assembly 222, where the readout laser source 216 shines the readout laser 218 into the diffuser and the diffuser diffuses the readout laser 218 such that the pump laser 210 is incident in a substantially equal manner along a surface of the atomic vapor cell assembly 222. In an additional embodiment, the readout laser source 216 may be multiple laser sources, where each laser source is associated with a pixel location or subset of the possible pixel locations. For example, the multiple laser sources may include VCSELs, where each VCSEL is located against a pixel location on a side of the atomic vapor cell assembly 222 that is opposite to the front side of the atomic vapor cell assembly 222.

In some embodiments, the system 202 may include one or more photodetectors 220 that detect the spontaneous readout photons 230 emitted by the atoms in the bright ground state within the atomic vapor cell assembly 222. For example, the one or more photodetectors 220 may be a layer of multiple photodetectors that are positioned to receive the spontaneous readout photons 230 emitted from a side of the atomic vapor cell assembly 222. In particular, the photodetectors 220 may be located on the opposite side of the atomic vapor cell assembly 222 from the front side of the atomic vapor cell assembly 222. In some implementations, the photodetectors 220 may be CCD photodetectors. Alternatively, the photodetectors 220 may be made using one or more other types of photon detecting technologies.

In further embodiments, the atoms within the atomic vapor cell assembly 222 may be associated with particular positions within the atomic vapor cell assembly 222. For example, the atomic vapor cell assembly 222 may include multiple atomic vapor cells, where each atomic vapor cell is associated with a pixel position within the atomic vapor cell assembly 222. Alternatively, the atomic vapor cell assembly 222 may include one atomic vapor cell and a lens layer, where the lens layer includes multiple lenses, where each lens may be associated with a different pixel position within the atomic vapor cell assembly 222. Additionally, the system 202 may include a different photodetector for each pixel location within the atomic vapor cell assembly 222.

In certain embodiments, the system 202 may be configured such that the photodetectors 220 are unable to receive the light emitted by the targeting laser source 214, the light emitted by the pump laser source 212, and the reflected portion 224 of the targeting laser 204. For example, the targeting laser source 214, the pump laser source 212, and the readout laser 218 may respectively emit the targeting laser 204 and the pump laser 210 in directions that are not incident on the photodetectors 220. Also, the system 202 may include a dichroic coating between the atomic vapor cell assembly 222 and the photodetectors 220. The dichroic coating may be configured to prevent light having the wavelength of the reflected portion 224 of the targeting laser 204 and the pump laser 210 from passing from the atomic vapor cell assembly 222 to the photodetectors 220 while allowing light having the wavelength of the readout laser 218 to pass from the atomic vapor cell assembly 222 to the photodetectors 220. Accordingly, as the readout laser 218 is emitted in a direction that is not incident on the photodetectors 220, the light produced by the system 202 that is incident on the photodetectors 220 includes the spontaneous readout photons 230 emitted from the atoms in the atomic vapor cell assembly 222.

The system 202 may include a processor 208 coupled to the photodetectors 220. When light is incident on a photodetector 220, the photodetector 220 may produce an electrical signal. The electrical signal may be received by the processor 208 and associated with the position of the photodetector 220 and/or the position of the pixel/atoms detected by the photodetector 220. The processor 208 may also control the operation of the targeting laser source 214, the pump laser source 212, and the readout laser source 216 and their interaction with the atoms within the atomic vapor cell assembly 222 and, in the case of the targeting laser source 214, the emission of the targeting laser 204 towards a target 206.

The processor 208 or other computational devices used in the system 202 may be implemented using software, firmware, hardware, or any appropriate combination thereof. The processor 208 and other computational devices may be supplemented by, or incorporated in, specially-designed application-specific integrated circuits (ASICs) or field programmable gate arrays (FGPAs). In some implementations, the processor 208 and/or other computational devices may communicate through an additional transceiver with other computing devices outside of the system 202. The processor 208 and other computational devices can also include or function with software programs, firmware, or other computer readable instructions for carrying out various process tasks, calculations, and control functions used in the present methods and systems.

The present methods may be implemented by computer executable instructions, such as program modules or components, which are executed by at least one processor 208. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer readable instructions. These instructions are typically stored on any appropriate computer program product that includes a computer readable medium used for storage of computer readable instructions or data structures. Such a computer readable medium can be any available media that can be accessed by a general purpose or special purpose computer or processor, or any programmable logic device.

Suitable computer readable storage media may include, for example, non-volatile memory devices including semiconductor memory devices such as Random Access Memory (RAM), Read Only Memory (ROM), Electrically Erasable Programmable ROM (EEPROM), or flash memory devices; magnetic disks such as internal hard disks or removable disks; optical storage devices such as compact discs (CDs), digital versatile discs (DVDs), Blu-ray discs; or any other media that can be used to carry or store desired program code in the form of computer executable instructions or data structures.

Accordingly, the system 202 may be suited for acquiring imagery data for processing by the processor 208 in low light environments. In particular, the reflected portion 224 of the targeting laser 204 off of the target 206 may be incident on atoms within the atomic vapor cell assembly 222 at particular pixel locations within the atomic vapor cell assembly 222. As the targeting laser 204 may reflect off features of the target 206, the different pixel locations, upon which the reflected portion 224 of the targeting laser 204 are incident, may correspond to the features of the target 206. Further, the reflected portion 224 of the targeting laser 204 and the pump laser 210 form the two legs of a Raman transition. Accordingly, the atoms that received the reflected portion 224 of the targeting laser 204 may transition to a bright state, whereupon they can absorb the light of the readout laser 218 and emit spontaneous readout photons 230 that are detected by the photodetectors 220.

The atoms that absorb the readout laser 218 may glow and emit photons that are detected by the photodetector 220. The photodetector 220 may provide an electrical signal to the processor 208 that indicates the pixel location of the atoms within the atomic vapor cell assembly 222 that are emitting light, and/or the intensity of the light emitted at the different pixel locations. The processor 208 may construct a representation of the target 206 from the information contained in the electrical signal. Also, the processor 208 may perform other image sensing related tasks. For example, the processor 208 may attempt to recognize objects, people, or perform other security related measures or information gathering tasks. The system 202 may acquire the information even when there are very few photons in the reflected portion 224 of the targeting laser 204. Also, the system may be able to detect the photons that enter the atomic vapor cell assembly 222 with a high quantum efficiency (>99%). Further, the system 202 may acquire image information for the target 206 with low dark counts. Accordingly, the system 202 may capably acquire image information in extremely low light environments.

As described above, the atomic vapor cell assembly 222 has been described as containing rubidium with lasers having wavelengths to interact with rubidium. The atomic vapor cell assembly 222 may contain other atoms, for example, cesium, or other alkali metals. Additionally, the atomic vapor cell assembly 222 may include combinations of atomic vapors, where the different atomic vapors interact with lasers of different wavelengths. Accordingly, the targeting laser source 214, the pump laser source 212, and the readout laser source 216 may each comprise multiple laser sources that emit photons of different wavelengths that are associated with the different atomic vapors within the atomic vapor cell assembly 222.

As described herein, the system 202 allows the acquisition of imagery data in extremely low light environments by using low intensity lasers, controlling the spatial origin of light emitted from each atom within the atomic vapor cell assembly 222, the use of neutral gases within the atomic vapor cell assembly 222, and the use of photon imaging optics. By combining the above features, the system 202 may provide a simple to manufacture and flexible pixel array sensor having low dark counts and high quantum efficiency.

Figure 3:
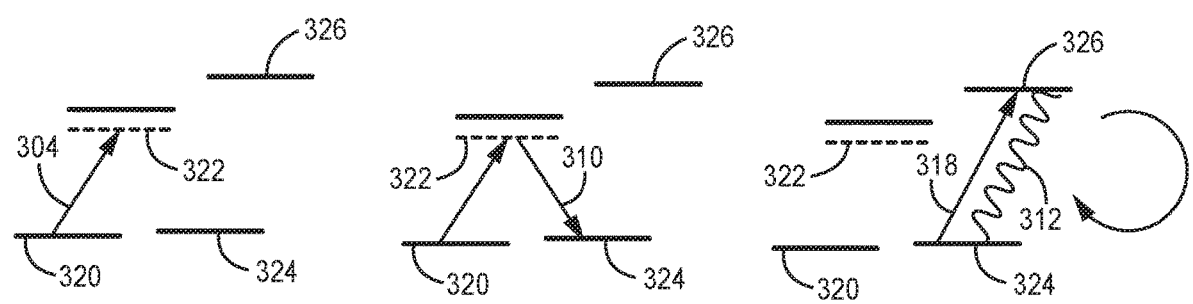
FIG. 3 is a diagram illustrating the transitions of atoms to different states when excited by photons according to an aspect of the present disclosure.

FIG. 3 is a diagram illustrating the transition of an atom between different ground states within the atomic vapor cell assembly 222 when the different lasers described above in FIG. 2 are incident upon the atom. For example, an atom within the atomic vapor cell assembly 222 may initially be at a dark ground state 320. In the dark ground state 320, the atom may be unable to both absorb readout laser photons 301 or emit spontaneous readout photons 312. The atom is able to transition from a dark ground state 320 to bright ground state 324 only when it absorbs both photons of a pair of photons which connect the ground states via an intermediate virtual state 322 in a Raman transition. For example, one photon in the pair of photons may be produced by the targeting laser source 214 when the reflected portion 224 of the targeting laser 204 reflects off the target 206 and is incident upon the atom. The other photon in the pair of photons may be produced by the pump laser source 212 when the emitted pump laser 210 is incident upon the atom.

In certain embodiments, when the atom in the dark ground state 320 is exposed to a continuous stream of pump photons 304, the atom is prepared to undergo a Raman transition to the bright ground state 324 upon absorption of a received target photon 310. An atom exposed to a continuous stream of photons which constitute one leg of a Raman transition can be referred to as an armed atom, in that those atoms are capable of transitioning from the dark ground state to the bright state through the two-photon Raman transition in the event that the other photon required for the transition is absorbed. To undergo a transition to the bright ground state 324, both the atom may absorb simultaneously, both required photons in the pair of photons required for the Raman transition. For example, when the atom is armed by being continuously exposed to pump laser photons 304, and subsequently absorbs the reflected portion 224 of the targeting laser 204 that reflected off the target 206, the atom may transition to the bright ground state 324 when a pump laser photon 304 and reflected targeting laser photon 301 are simultaneously absorbed by the atom. When the atom is in the bright ground state 324, the atom is able to absorb readout laser photons 318 and emit spontaneous readout photons 312.

As the atom is in the bright ground state 324, when photons having a particular wavelength are incident upon the atom, the atom may absorb 318 and emit 312 a particular photon. For example, the atom may absorb a photon of the readout laser 218, whereupon the atom may absorb 318 the photon and emit 312 the photon for absorption by the photodetector 220. Accordingly, an atom may be prepared to absorb and emit photons within an atomic vapor cell assembly 222.

Figure 4A:
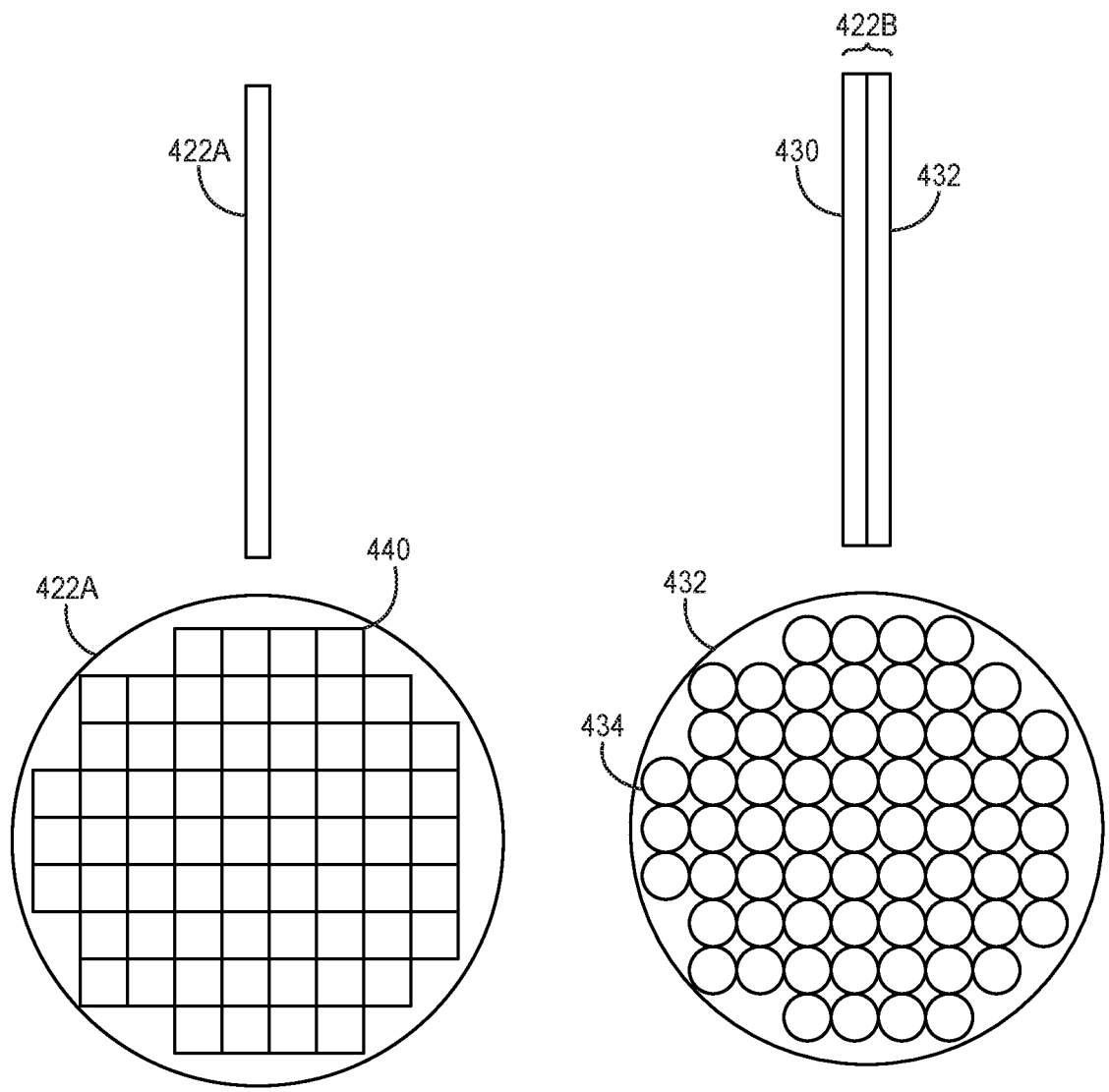
FIGS. 4A and 4B are diagrams illustrating different embodiments of atomic vapor cell assemblies according to aspects of the present disclosure.
Figure 4B:
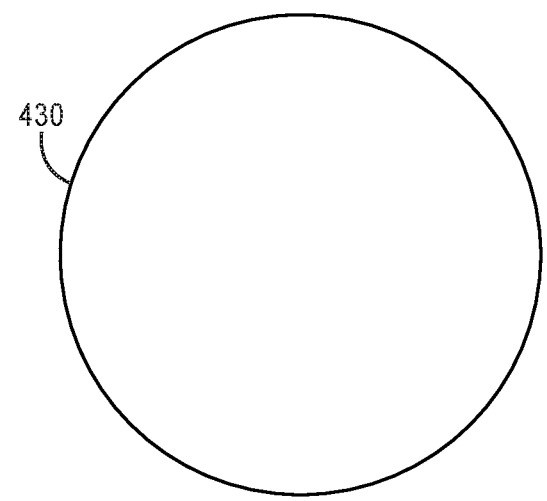

FIGS. 4A and 4B are diagrams illustrating various embodiments of an atomic vapor cell assembly 222. In particular, FIG. 4A illustrates an atomic vapor cell assembly 422A that includes multiple atomic vapor cells 440. In contrast, FIG. 4B illustrates an atomic vapor cell assembly 422B that includes a single atomic vapor cell 430 and a microlenses layer 432. Both atomic vapor cell assemblies 422A and 422B allow the distinguishing of pixel locations within the respective atomic vapor cell assemblies 422A and 422B.

With respect to the atomic vapor cell assembly 422A of FIG. 4A, multiple atomic vapor cells 440 may be formed on a single chip. For example, the multiple atomic vapor cells 440 may be formed using technologies used to form chip scale atomic clocks (CSAC). When the multiple atomic vapor cells 440 are formed, each cell may contain an alkali gas and a buffer gas. Atoms within the alkali gas may be positioned to respond to photons that are incident on atoms within the alkali gas as described above. When atoms within the alkali gas absorb and emit a photon, the atom may be constrained to emit a photon at a location within the atomic vapor cell 440 containing the atom. Accordingly, the location of the atom may be constrained to a location and the location of the atomic vapor cell 440 may be associated with a pixel location. Thus, when the atomic vapor cell assembly 422A includes an array of multiple atomic vapor cells 440, each atomic vapor cell 440 may be associated with a different pixel location.

As each atomic vapor cell 440 may be associated with a different pixel location, the resolution of the image produced by the atomic vapor cell assembly 422A may be limited by the size of the atomic vapor cells 440. However, in certain applications, high resolution image data may be unnecessary. For example, in facial recognition applications, algorithms may reliably identify individuals from image data having as few as 1600 pixels (such as that found in a 40×40 array of pixels).

With respect to the atomic vapor cell assembly 422B of FIG. 4B, the atomic vapor cell assembly 422B may include an atomic vapor cell 430 and a microlenses layer 432. As illustrated, the atomic vapor cell 430 may be a single atomic vapor cell, where a reflected portion 224 of the targeting laser 204 reflected from a target 206 may be incident on atoms within the single atomic vapor cell 430.

In a similar manner, the atomic vapor cell 430 may contain one or more alkali gases and one or more buffer gases. Atoms within the alkali gas may be positioned to respond to the light that is incident on the alkali gas as described above. At the location where an atom receives a photon, the atom may emit a photon. When the atom emits a photon, a microlens on the microlenses layer 432 may receive the photon and direct the photon to a particular photodetector in the photodetectors 220, where the photodetector and microlens are associated with a particular pixel location. As each microlens 434 may be associated with a different pixel location, the resolution of the image produced by the atomic vapor cell assembly 422B may be limited by the size of the microlenses 434.

In some embodiments, the atomic vapor cell assembly 222 may include a combination of atomic vapor cells 440 and a microlenses layer 432. For example, microlenses 434 may be smaller than atomic vapor cells 440 and, thus, be able to provide a higher resolution than atomic vapor cells 440. Accordingly, when a higher resolution is desired than what can be fabricated using atomic vapor cells 440, a microlens layer 432 may be used to increase the resolution.

Figure 5:
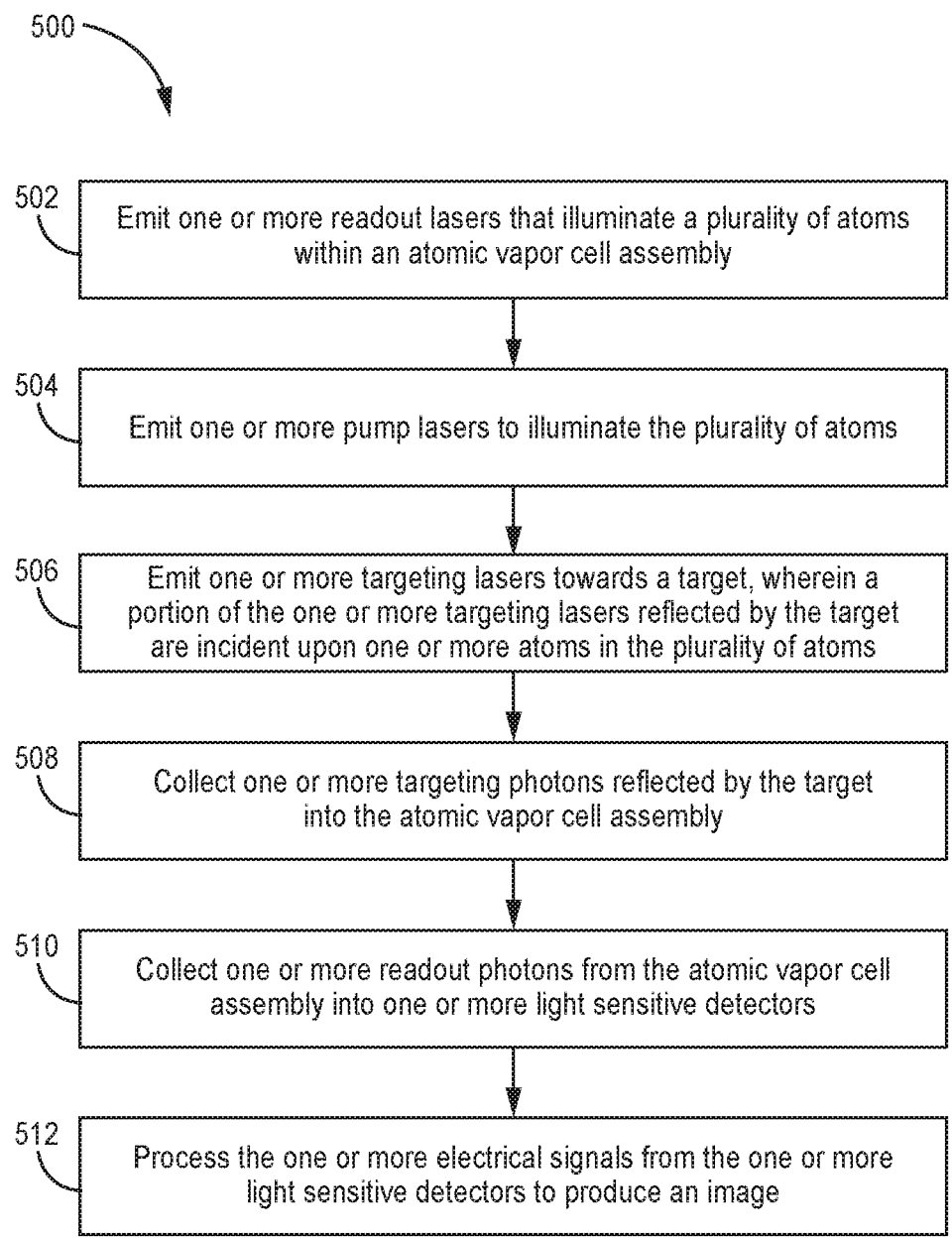
FIG. 5 is a flowchart diagram illustrating an exemplary method for image sensing using an atomic vapor cell assembly according to an aspect of the present disclosure.

FIG. 5 is a flowchart diagram illustrating an exemplary method 500 for image sensing using an atomic vapor cell assembly. Method 500 proceeds at 502, where one or more readout lasers 216 are emitted that illuminate a plurality of atoms within an atomic vapor cell assembly 222. For example, one or more readout lasers 216 are emitted into the side of an atomic vapor cell assembly 222. If atoms within the atomic vapor cell assembly 222 are in the bright ground state, the atoms in the bright ground state may absorb the photons of the readout lasers 216 and emit photons 230 that can be detected by photodetectors 220 associated with particular pixel locations.

To prepare atoms within the atomic vapor cell assembly 222 to be in the bright ground state, the method 500 may proceed at 504, where one or more pump lasers 210 are emitted to illuminate the plurality of atoms. The one or more pump lasers 210 emit one of the two kinds of photons needed for the atoms to make a Raman transition to a bright ground state. Further, method 500 may proceed at 506, where one or more targeting lasers 204 are emitted towards a target 206 and a portion 224 of the one or more targeting lasers 204 are reflected by the target 206 and the reflected portion 224 is incident upon one or more atoms in the plurality of atoms.

In further embodiments, the method 500 proceeds at 508, where one or more targeting photons reflected by the target 206 are collected into the atomic vapor cell assembly 222. For example, the portion 224 of the one or more targeting lasers 204 that is reflected by the target 206 may be collected into the atomic vapor cell assembly 222, where the portion 224 may be absorbed by atoms within the atomic vapor cell assembly 222. Additionally, the method 500 may proceed at 510, where one or more readout photons from the atomic vapor cell assembly are collected into one or more light sensitive detectors. For example, the readout photons 230 may be emitted by the atoms in the atomic vapor cell assembly 222 and collected by one or more photodetectors 220. Moreover, the method 500 may proceed at 512, where the one or more electrical signals from the one or more light sensitive detectors may be processed to produce an image. For example, the when a readout photon 230 is received by a photodetector 220, the photodetector 220 may produce an electrical signal. A processor 208 may receive the electrical signal and process the electrical signal along with other signals received from other photodetectors 220 to produce an image of the target 206.

Example Embodiments

Example 1 includes a device comprising: an atomic vapor cell assembly containing a plurality of atoms associated with a plurality of pixel locations; one or more readout laser sources that emit one or more readout lasers that illuminate the plurality of atoms; one or more pump laser sources that illuminate the plurality of atoms with one or more pump lasers to prepare one or more atoms in the plurality of atoms that are in a dark ground state, wherein an atom in the dark ground state is not coupled to the one or more readout lasers; and one or more targeting laser sources that emit one or more targeting lasers towards a target, wherein a portion of the one or more targeting lasers reflected by the target that is incident upon the one or more atoms causes the one or more atoms to transition to a bright ground state; wherein the one or more atoms in the bright ground state are coupled to the one or more readout lasers and emit one or more readout photons.

Example 2 includes the device of Example 1, further comprising: a photodetector assembly configured to: detect the one or more readout photons emitted by the one or more atoms; and determine one or more pixel locations in the plurality of pixel locations associated with the one or more atoms.

Example 3 includes the device of Example 2, wherein the photodetector assembly comprises a plurality of charge coupled devices, wherein each charge coupled device is associated with a pixel location in the plurality of pixel locations.

Example 4 includes the device of any of Examples 1-3, wherein the atomic vapor cell assembly comprises a plurality of atomic vapor cells.

Example 5 includes the device of any of Examples 1-4, wherein the atomic vapor cell assembly comprises: an atomic vapor cell; and a microlens layer, where the microlens layer comprises a plurality of microlenses, each microlens associated with a pixel location in the plurality of pixel locations.

Example 6 includes the device of any of Examples 1-5, further comprising a dichroic coating formed on a side of the atomic vapor cell assembly that is opposite to a front side of the atomic vapor cell assembly, wherein the portion of the one or more targeting lasers enters the atomic vapor cell assembly through the front side and the one or more readout photons pass through the dichroic coating.

Example 7 includes the device of any of Examples 1-6, wherein the one or more readout lasers, the one or more pump lasers, and the one or more target lasers have wavelengths in the infrared range.

Example 8 includes the device of any of Examples 1-7, wherein the one or more readout lasers and the one or more pump lasers enter the atomic vapor cell assembly through a side of the atomic vapor cell assembly that is adjacent to a front side of the atomic vapor cell assembly, wherein the portion of the one or more targeting lasers enters the atomic vapor cell assembly through the front side.

Example 9 includes the device of any of Examples 1-8, wherein at least one of the one or more readout laser sources and the one or more pump laser sources comprise a plurality of vertical cavity surface emitting lasers (VCSELs), wherein each VCSEL in the plurality of VCSELs is associated with a pixel location in the plurality of pixel locations.

Example 10 includes a method comprising: emitting one or more readout lasers that illuminate a plurality of atoms within an atomic vapor cell assembly; emitting one or more pump lasers to illuminate the plurality of atoms with one or more pump lasers to prepare one or more atoms in the plurality of atoms that are in a dark ground state, wherein an atom in the dark ground state is not coupled to the one or more readout lasers; and emitting one or more targeting lasers towards a target, wherein a portion of the one or more targeting lasers reflected by the target that is incident upon the one or more atoms causes the one or more atoms to transition to a bright ground state, wherein the one or more atoms in the bright ground state are coupled to the one or more readout lasers and emit one or more readout photons.

Example 11 includes the method of Example 10, further comprising: detecting the readout photons emitted by the one or more atoms; and determining one or more pixel locations in a plurality of pixel locations associated with the one or more atoms.

Example 12 includes the method of Example 11, wherein detecting the readout photons comprises receiving the emitted photons at one or more charge coupled devices, wherein each charge coupled device is associated with a pixel location in the plurality of pixel locations.

Example 13 includes the method of any of Examples 11-12, wherein the atomic vapor cell assembly comprises an atomic vapor cell and a microlens layer, wherein detecting the readout photons further comprises: emitting a readout photon in the one or more readout photons through a microlens in the microlens layer, wherein the microlens is associated with a pixel location in the one or more pixel locations; and detecting the readout photon at a photodetector associated with the pixel location.

Example 14 includes the method of any of Examples 10-13, wherein the atomic vapor cell assembly comprises a plurality of atomic vapor cells.

Example 15 includes the method of Example 14, wherein the plurality of atomic vapor cells are formed on a chip.

Example 16 includes the method of any of Examples 10-15, further comprising blocking the portion of the one or more targeting lasers and the one or more pump lasers with a dichroic coating formed on a side of the atomic vapor cell assembly that is opposite to a front side of the atomic vapor cell assembly, wherein the portion of the one or more targeting lasers enters the atomic vapor cell assembly through the front side.

Example 17 includes the method of any of Examples 10-16, wherein the one or more readout lasers, the one or more pump lasers, and the one or more target lasers have wavelengths in the infrared range.

Example 18 includes the method of any of Examples 10-17, wherein emitting the one or more readout lasers and the one or more pump lasers comprises emitting the one or more readout lasers and the one or more pump lasers through one or more sides of the atomic vapor cell assembly that are adjacent to a front side of the atomic vapor cell assembly, wherein the portion of the one or more targeting lasers enters the atomic vapor cell assembly through the front side.

Example 19 includes the method of any of Examples 10-18, wherein emitting the one or more readout lasers and the one or more pump lasers comprises emitting at least one of the one or more readout lasers and the one or more pump laser with a plurality of vertical cavity surface emitting lasers.

Example 20 includes a device comprising: an atomic vapor cell assembly containing a plurality of atoms associated with a plurality of pixel locations; one or more readout laser sources that emit one or more readout lasers that illuminate the plurality of atoms; one or more pump laser sources that illuminate the plurality of atoms with one or more pump lasers to prepare one or more atoms in the plurality of atoms that are in a dark ground state, wherein an atom in the dark ground state is not coupled to the one or more readout lasers; one or more targeting laser sources that emit one or more targeting lasers towards a target, wherein a portion of the one or more targeting lasers reflected by the target that is incident upon the one or more atoms causes the one or more atoms to transition to a bright ground state, wherein the one or more atoms in the bright ground state are coupled to the one or more readout lasers and emit one or more readout photons; and a photodetector assembly configured to detect the one or more readout photons emitted by the one or more atoms and determine one or more pixel locations in the plurality of pixel locations associated with the one or more atoms.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A device comprising:
an atomic vapor cell assembly containing a plurality of atoms associated with a plurality of pixel locations;
one or more readout laser sources that emit one or more readout lasers that illuminate the plurality of atoms;
one or more pump laser sources that illuminate the plurality of atoms with one or more pump lasers to prepare one or more atoms in the plurality of atoms that are in a dark ground state, wherein an atom in the dark ground state is not coupled to the one or more readout lasers; and
one or more targeting laser sources that emit one or more targeting lasers towards a target, wherein a portion of the one or more targeting lasers reflected by the target that is incident upon the one or more atoms causes the one or more atoms to transition to a bright ground state;
wherein the one or more atoms in the bright ground state are coupled to the one or more readout lasers and emit one or more readout photons.

2. The device of claim 1, further comprising:
a photodetector assembly configured to:
detect the one or more readout photons emitted by the one or more atoms; and
determine one or more pixel locations in the plurality of pixel locations associated with the one or more atoms.

3. The device of claim 2, wherein the photodetector assembly comprises a plurality of charge coupled devices, wherein each charge coupled device is associated with a pixel location in the plurality of pixel locations.

4. The device of claim 1, wherein the atomic vapor cell assembly comprises a plurality of atomic vapor cells.

5. The device of claim 1, wherein the atomic vapor cell assembly comprises:
an atomic vapor cell; and
a microlens layer, where the microlens layer comprises a plurality of microlenses, each microlens associated with a pixel location in the plurality of pixel locations.

6. The device of claim 1, further comprising a dichroic coating formed on a side of the atomic vapor cell assembly that is opposite to a front side of the atomic vapor cell assembly, wherein the portion of the one or more targeting lasers enters the atomic vapor cell assembly through the front side and the one or more readout photons pass through the dichroic coating.

7. The device of claim 1, wherein the one or more readout lasers, the one or more pump lasers, and the one or more target lasers have wavelengths in the infrared range.

8. The device of claim 1, wherein the one or more readout lasers and the one or more pump lasers enter the atomic vapor cell assembly through a side of the atomic vapor cell assembly that is adjacent to a front side of the atomic vapor cell assembly, wherein the portion of the one or more targeting lasers enters the atomic vapor cell assembly through the front side.

9. The device of claim 1, wherein at least one of the one or more readout laser sources and the one or more pump laser sources comprise a plurality of vertical cavity surface emitting lasers (VCSELs), wherein each VCSEL in the plurality of VCSELs is associated with a pixel location in the plurality of pixel locations.

10. A method comprising:
emitting one or more readout lasers that illuminate a plurality of atoms within an atomic vapor cell assembly;
emitting one or more pump lasers to illuminate the plurality of atoms with one or more pump lasers to prepare one or more atoms in the plurality of atoms that are in a dark ground state, wherein an atom in the dark ground state is not coupled to the one or more readout lasers; and
emitting one or more targeting lasers towards a target, wherein a portion of the one or more targeting lasers reflected by the target that is incident upon the one or more atoms causes the one or more atoms to transition to a bright ground state, wherein the one or more atoms in the bright ground state are coupled to the one or more readout lasers and emit one or more readout photons.

11. The method of claim 10, further comprising:
detecting the readout photons emitted by the one or more atoms; and
determining one or more pixel locations in a plurality of pixel locations associated with the one or more atoms.

12. The method of claim 11, wherein detecting the readout photons comprises receiving the emitted photons at one or more charge coupled devices, wherein each charge coupled device is associated with a pixel location in the plurality of pixel locations.

13. The method of claim 11, wherein the atomic vapor cell assembly comprises an atomic vapor cell and a microlens layer, wherein detecting the readout photons further comprises:
emitting a readout photon in the one or more readout photons through a microlens in the microlens layer, wherein the microlens is associated with a pixel location in the one or more pixel locations; and
detecting the readout photon at a photodetector associated with the pixel location.

14. The method of claim 10, wherein the atomic vapor cell assembly comprises a plurality of atomic vapor cells.

15. The method of claim 14, wherein the plurality of atomic vapor cells are formed on a chip.

16. The method of claim 10, further comprising blocking the portion of the one or more targeting lasers and the one or more pump lasers with a dichroic coating formed on a side of the atomic vapor cell assembly that is opposite to a front side of the atomic vapor cell assembly, wherein the portion of the one or more targeting lasers enters the atomic vapor cell assembly through the front side.

17. The method of claim 10, wherein the one or more readout lasers, the one or more pump lasers, and the one or more target lasers have wavelengths in the infrared range.

18. The method of claim 10, wherein emitting the one or more readout lasers and the one or more pump lasers comprises emitting the one or more readout lasers and the one or more pump lasers through one or more sides of the atomic vapor cell assembly that are adjacent to a front side of the atomic vapor cell assembly, wherein the portion of the one or more targeting lasers enters the atomic vapor cell assembly through the front side.

19. The method of claim 10, wherein emitting the one or more readout lasers and the one or more pump lasers comprises emitting at least one of the one or more readout lasers and the one or more pump laser with a plurality of vertical cavity surface emitting lasers.

20. A device comprising:

an atomic vapor cell assembly containing a plurality of atoms associated with a plurality of pixel locations;

one or more readout laser sources that emit one or more readout lasers that illuminate the plurality of atoms;

one or more pump laser sources that illuminate the plurality of atoms with one or more pump lasers to prepare one or more atoms in the plurality of atoms that are in a dark ground state, wherein an atom in the dark ground state is not coupled to the one or more readout lasers;

one or more targeting laser sources that emit one or more targeting lasers towards a target, wherein a portion of the one or more targeting lasers reflected by the target that is incident upon the one or more atoms causes the one or more atoms to transition to a bright ground state, wherein the one or more atoms in the bright ground state are coupled to the one or more readout lasers and emit one or more readout photons; and a photodetector assembly configured to detect the one or more readout photons emitted by the one or more atoms and determine one or more pixel locations in the plurality of pixel locations associated with the one or more atoms.

* * * * *